US012099965B2

(12) United States Patent
Moss et al.

(10) Patent No.: US 12,099,965 B2
(45) Date of Patent: Sep. 24, 2024

(54) TRACKING QUALITATIVE PARAMETERS USING A BLOCKCHAIN PROVENANCE SYSTEM

(71) Applicant: Red Hat, Inc., Raleigh, NC (US)

(72) Inventors: Emily Elizabeth Moss, San Mateo, CA (US); Gina Norman Likins, Raleigh, NC (US); Axel Simon, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 18 days.

(21) Appl. No.: 17/326,705

(22) Filed: May 21, 2021

(65) Prior Publication Data

US 2022/0374823 A1    Nov. 24, 2022

(51) Int. Cl.
*G06Q 10/087* (2023.01)

(52) U.S. Cl.
CPC ................ *G06Q 10/087* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 10,176,481 B2 * | 1/2019 | Aljawhari | H04L 9/3236 |
| 10,504,165 B1 * | 12/2019 | Goyal | G01G 19/4144 |
| 2010/0274629 A1 * | 10/2010 | Walker | G06Q 10/087 |
| | | | 705/308 |
| 2019/0339678 A1 * | 11/2019 | Biernat | H04L 63/12 |
| 2022/0343262 A1 * | 10/2022 | Bhatti | G06Q 10/0838 |
| 2022/0366406 A1 * | 11/2022 | Perez | G06F 16/27 |

* cited by examiner

*Primary Examiner* — Florian M Zeender
*Assistant Examiner* — Vanessa Deligi
(74) *Attorney, Agent, or Firm* — Womble Bond Dickinson (US) LLP

(57) ABSTRACT

A system and method for using a blockchain provenance system to determine and/or track the qualitative issues associated with the supply chain state of one or more products, including obtaining a product identifier and a first set of parameters associated with the product identifier, each parameter indicative of a supply chain state of a product corresponding to the product identifier; determining, in view of the set of parameters, a first set of qualitative issues associated with the supply chain state of the product; and updating a ledger of a blockchain system to indicate an association between the product identifier and the first set of qualitative issues associated with the supply chain state of the product.

13 Claims, 9 Drawing Sheets

300

Product Ethicality Application

~~~ Scanned Product Description ~~~
Brand: [Brand Name]
Model Number: [Model Number]

302

Product Ethicality Report

| 304 | 303 306 | 308 | 310 |
|---|---|---|---|
| Carbon Footprint | Child Labor | Animal Testing | Sustainable Farming and Animal Husbandry |
| A | F | D | B |

Customization Filter Tool

| Ethical Issues 312 | 314 Enabled | 316 Importance Level 315 |
|---|---|---|
| Carbon Footprint 313 | Yes | Medium |
| Child Labor | Yes | High |
| Animal Testing | Yes | High |
| Drug and/or Human Tracking | No | N/A |
| Political Structure | No | N/A |
| Working Wages | No | N/A |
| Global Warming | No | N/A |
| Sustainable Farming and Animal Husbandry | Yes | Low |
| Genetic Manipulation (GMO) | No | N/A |

Customer Request Tool

318 [<Fill in with requested ethical issue>]    320 [Submit Request]

FIG. 3

TRACKING QUALITATIVE PARAMETERS USING A BLOCKCHAIN PROVENANCE SYSTEM

TECHNICAL FIELD

The present disclosure relates generally to blockchain technology, and more particularly, to systems and methods for using a blockchain provenance system to determine and/or track qualitative parameters (e.g., ethical issues) associated with the supply chain of one or more products.

BACKGROUND

A blockchain is a peer-to-peer, electronic ledger which is implemented as a computer-based distributed, decentralized system that consists of blocks that include transactions. Each transaction is a data structure that encodes the transfer of control of a digital asset between participants in the blockchain system. Each block contains a hash of the previous block such that the blocks may be chained together to form a permanent, tamper-evident record of all transactions which have been written to the blockchain since its inception.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a graphical user interface (GUI) of an example application depicting a method for displaying ethical issues associated with the supply chain of a product and corresponding scores, according to some embodiments;

DETAILED DESCRIPTION

Figure 1:
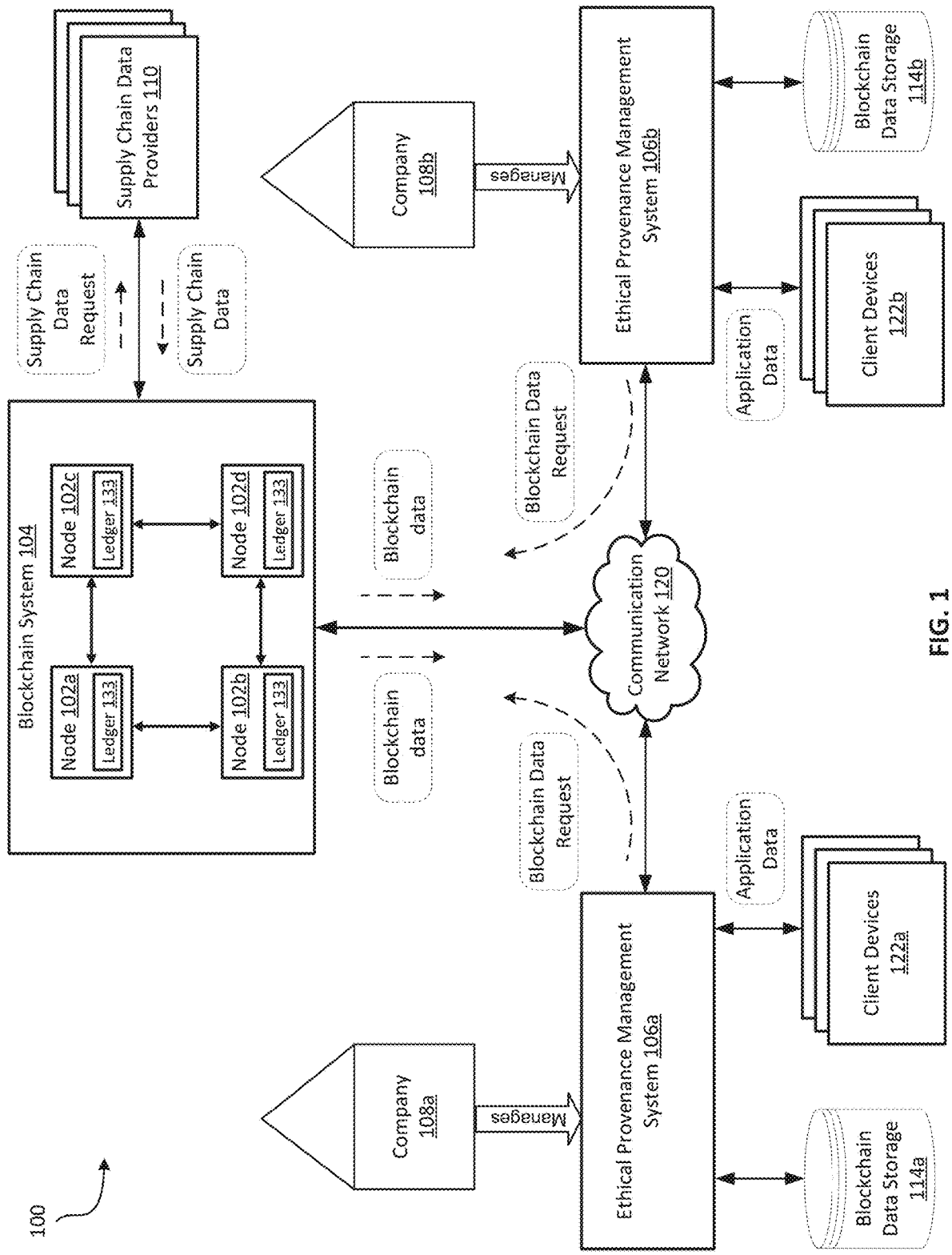
FIG. 1 is a block diagram depicting an example environment for using a blockchain provenance system to determine and/or track the ethical issues associated with the supply chain of one or more products, according to some embodiments.

Consumers are concerned with purchasing products that are produced responsibly and ethically, and there are many factors that the consumer may consider when making this determination. For example, a consumer may be concerned about the carbon footprint of production of a product, the working conditions of the labor required to produce the product, and/or the geopolitical area in which the product was produced.

Determining whether a product has been produced ethically requires extensive research into multiple subjects and some of the information is not available in a format that is easily consumed by the average customer. Therefore, making holistic, ethical purchasing decisions is simply too much work. For example, if a consumer buys a shirt from an apparel store, the consumer may want to know how the shirt was manufactured, such as whether the individuals involved in manufacturing the shirt were paid a working wage, whether child labor was involved, the distance that the shirt traveled from its point of manufacture and the carbon emissions produced as a result, the size of the carbon footprint resulting from the manufacturing process, and whether animal testing was involved.

Some of the conventional inventory tracking systems are designed to track the ownership of assets throughout their lifetime by using a blockchain network, and in some instances, for the purpose of minimizing fraud. That is, participants in the blockchain network of a conventional inventory tracking system, such as merchants, banks, and insurers, can verify if an asset is legitimate or fraudulent. For example, a consumer may purchase and insure a diamond and then register it with the conventional inventory tracking system. If a thief steals the diamond from the consumer, then the consumer can report the stolen diamond to the insurance company, which in turn, will report it to the conventional inventory tracking system. Afterwards, if the thief tries to sell the diamond to a jeweler, the jeweler may determine that the diamond was stolen by querying the conventional inventory tracking system.

However, there are drawbacks with the conventional inventory tracking systems is that they lack the capability to track the ethical issues (sometimes referred to as, "qualitative parameters") associated with the supply chain of a product. Additionally, previously untracked ethical issues may arise from time to time, but even newer, blockchain-based inventory tracking systems are unable to add new attributes into an existing system, let alone adding them in a dynamic, real-time manner that can keep pace with the ever-evolving ethical landscape. As a result, consumers who are interested in learning about the ethical issues associated with a product must perform a series of internet queries using their mobile device and whatever networking infrastructure that is available to the consumer at the retailer that is selling the product. This is slow, often ineffective due to poor mobile connectivity and the dearth of publicly-available Wi-Fi, as well as potentially burdensome to network infrastructure. This combination may result in consumer frustration, network congestion, and/or increased power consumption due to the networking infrastructure. Given the original query pertained to the "ethicality" of the product, an investigation that results in greater energy consumption is antithetical to the goal.

Aspects of the disclosure address the above-noted and other deficiencies by determining and/or tracking qualitative properties (e.g., ethical issues) using blockchain. A blockchain system may be used to determine and/or track the ethical issues associated with the supply chain (sometimes referred to as "supply chain state") of one or more products. That is, the blockchain provenance system may use blockchain technology to collect and consolidate a product's entire ethical scope into a single data report that is easily retrievable and understandable by the average consumer. The ability of a blockchain to track provenance means, for example, that if one batch of sweatshirts produced by Manufacturer X were produced in the United States in a "green" facility, while another was produced by child laborers in Taiwan in a factory that was dumping pollutants into the river, the representations of those two garments in the system would reflect those differences, even if they ended up hanging side-by-side on the same rack.

In various embodiments, as described in the below passages, a blockchain provenance system of the present disclosure may include the features of: generating a product ethicality data report and making it available via a quick response (QR) code or barcode associated with a product that the user can scan with their phone; the product ethicality report can be filtered, in view of an individual's consumer moral compass (sometimes referred to as, "user preference data"), and then presented in a visually appealing, easy-to-scan way; an application programming interface (API) may be used to allow easy addition of new ethical concerns or removal of prior concerns; and/or the platform may include a provenance proof blockchain that would record the operations and extensive parameters along the supply chain.

Benefits of using a blockchain provenance system of the present disclosure may include a reduction in the network congestion across a networking infrastructure and/or a reduction in the power consumption to operate the networking infrastructure because a consumer may not have to perform a series (e.g., multiple) of internet queries using the networking infrastructure to determine the ethical issues associated with a product. Instead, a consumer may learn about all the ethical issues associated with a product by sending fewer queries (e.g., as few as one, in some embodiments) across the networking infrastructure, which in turn, releases the networking resources (and uses less power) of the network infrastructure to allow other consumers to perform similar queries.

FIG. 1 is a block diagram depicting an example environment for using a blockchain provenance system to determine and/or track the ethical issues associated with the supply chain of one or more products, according to some embodiments. The environment 100 includes blockchain system 104, supply chain data providers 110, and ethical provenance (EP) management system 106a and EP management system 106b. The blockchain system 104 is communicably coupled to the supply chain data providers 110 and EP management systems 106a, 106b via a communication network 120. The environment 100 includes client devices 122a and client devices 122b.

The environment 100 includes a company 108a that manages (e.g., controls, operates) the EP management system 106a, which is communicatively coupled with the client devices 122a via a public network (e.g., communication network 120), or a private network that is not accessible by any other EP management system (e.g., EP management system 106b). The environment 100 includes a company 108b that manages (e.g., controls, operates) the EP management system 106b, which is communicatively coupled with the client devices 122b via a public network (e.g., communication network 120), or a private network that is not accessible by any other EP management system (e.g., EP management system 106a). The company 108a and/or company 108b may be any type of company that sells goods such as, for example, a department store, a clothing store, a sporting goods store, a hardware store, a book store, a medical store, a home furnishing store, an electronics store, an appliance store, a grocery store, a convenient store, a general merchandise store, or any other type of retail store.

The environment 100 includes one or more supply chain data providers 110 that are communicably coupled to the blockchain system 104. The supply chain data providers 110 are each configured to receive a request (shown in FIG. 1 as, "supply chain data request") from the blockchain system 104 (e.g., from a node of the blockchain system) for one or more parameters (shown in FIG. 1 as, "supply chain data") that are associated with the supply chain of one or more products. In some embodiments, the request may include one or more product identifiers. In response, the each of supply chain data providers 110 that receive the request may provide (e.g., send, transmit, deliver) one or more parameters (shown in FIG. 1 as, "supply chain data") that are associated with the supply chain of the one or more products corresponding to the product identifiers. In some embodiments, a supply chain data provider 110 may collect (e.g., aggregate, gather, bundle) the one or more parameters (shown in FIG. 1 as, "supply chain data") from other supply chain providers 110 in response to receiving the request, and send all the collected parameters to the blockchain system 104. In some embodiments, the supply chain providers 110 may periodically (or in real-time) push supply chain data to the blockchain system 104 without receiving a request from the blockchain system 104, for example, when a supply chain provider 110 determines that new supply chain data becomes available to one or more of the supply chain providers 110.

In some embodiments, supply chain data (one or more parameters) may correspond to any data associated with a system of organizations, people, activities, information, and/or resources involved in supplying a product or service to a consumer. In some embodiments, supply chain activities may involve the transformation of natural resources, raw materials, and/or components into a finished product that is delivered to the end customers (e.g., customers of company 108a and/or company 108b, users of client devices 122a and/or client devices 122b, etc.).

In some embodiments, supply chain data may include any data that is indicative of a size of a carbon footprint, such as the amount and/or type of emissions that were produced as a result of manufacturing a product. In some embodiments, supply chain data may include any data that is indicative of whether child labor was used to manufacture a product, such as the ages (e.g., range, average, min/max, etc.) of the workers. In some embodiments, supply chain data may include any data that is indicative of the political structure of the companies involved in the manufacturing of a product. In some embodiments, supply chain data may include any data that is indicative of whether the companies involved in the manufacturing of a product are against or in support of drug and/or human trafficking. In some embodiments, supply chain data may include any data that is indicative of whether the companies involved in the manufacturing of a product are against or in support of diversity-friendly programs.

In some embodiments, supply chain data may include any data that is indicative of whether the companies involved in the manufacturing of a product paid their workers a working wages (a minimum income necessary for a worker to meet their basic needs), such as the salary (e.g., range, average, min/max, etc.), amount and/or type of benefits (e.g., health, dental, vision, vacation time, etc.) and promotion opportunities. In some embodiments, supply chain data may include any data that is indicative of whether the activities used to manufacture a product positively or negatively contributed to global warming. In some embodiments, supply chain data may include any data that is indicative of whether the activities used to manufacture a product involved sustainable farming and/or animal husbandry practices, such as the types of activities used to promote good animal health and the frequency in which the crops were rotated. In some embodiments, supply chain data may include any data that is indicative of whether the activities used to manufacture a product involved genetic manipulation (GMO), and/or organic ingredients and/or components. In some embodiments, supply chain data may include any data that is indicative of whether a product is designed against planned obsolescence (e.g., promotes goods longevity) and/or designed with user-configurable replacement parts.

The environment 100 includes a blockchain data storage 114a that is communicably coupled to the EP management system 106a. The EP management system 106a may populate (e.g., fill, insert) the blockchain data storage 114a with blockchain data that is associated with one or more products that are advertised and/or sold by company 108a, client data that is associated with client devices 122a and/or users of client devices 122a, and any other data that is received and/or generated by EP management system 106a. In some embodiments, the client data may correspond to data that is stored in an account of a user of a client device 122a, where the account is under the control and/or management of company 108a.

The environment 100 includes a blockchain data storage 114b that is communicably coupled to the EP management system 106b. The EP management system 106b may populate the blockchain data storage 114b with blockchain data that is associated with one or more products that are advertised and/or sold by company 108b, client data that is associated with client devices 122b and/or users of client devices 122b, and any other data that is received and/or generated by EP management system 106b. In some embodiments, the client data may correspond to data that is stored in an account of a user of a client device 122b, where the account is under the control and/or management of company 108b.

The blockchain system 104 includes nodes 102a, 102b, 102c, and 102d (collectively referred to as, "nodes 102") that are communicably connected with one another via communication network 120 to form a peer-to-peer network (sometimes referred to as, "distributed ledger technology (DLT) network"). Each of the nodes 102 of the blockchain system 104 use a ledger 133 to record transactions (e.g., transmitting messages, processing messages, results of actions, etc.) that are executed in the blockchain system 104. As shown in FIG. 1, each of the nodes stores (e.g., includes) a copy of the ledger 133. Each node 102 may broadcast (e.g., transmit, send) a copy of their ledger 133 to one or more of the neighboring nodes in the blockchain system 104 to ensure that each node in the blockchain system 104 may be able to validate the transactions that occur in the blockchain system 104 via a set of consensus rules.

Each ledger 133 (e.g., a distributed ledger) includes a plurality of blocks which are linked together and are secured using cryptographic functions. For example, each block may include a hash of the previous block, a timestamp, and other data (e.g., a copy of the message, a result, parameters (supply chain data), product identifiers, etc.). In some embodiments, each block may include one or more linkages (e.g., mapping, pairs, associations) between parameters and product identifiers, such that each linkage is between a product identifier and one or more parameters associated with a supply chain of a product corresponding to the product identifier.

A node 102 may be a combination of one or more computing devices. A computing device may be any suitable type of computing device or machine that has a processing device, for example, server computers, desktop computers, laptop computers, tablet computers, smartphones, set-top boxes, a graphics processing unit (GPU), etc. In some examples, a computing device may comprise a single machine or may include multiple interconnected machines (e.g., multiple servers configured in a cluster).

A node 102 may be one or more virtual environments. In one embodiment, a virtual environment 113 may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The blockchain system 104 may use the same type or different types of virtual environments. For example, all of the nodes 102 may be VMs. In another example, all of the nodes 102 may be containers. In a further example, some of the nodes 102 may be VMs, other nodes 102 may be containers, and other nodes may be computing devices (or groups of computing devices).

In one embodiment, the blockchain system 104 may be a permissioned blockchain. A permissioned blockchain may be a blockchain where the nodes 102 are authenticated or given permission to be included in the blockchain system 104. For example, the nodes 102 may have been previously verified or authenticated with an administrator or an administrative group that manages or oversees the blockchain system 104. This may indicate that each of the nodes 102 are trusted by the blockchain system 104 and thus security requirements or operations for accessing the ledger 133 that may generally be used in blockchain systems, may be relaxed or reduced. For example, the computational task (e.g., a computational challenge) for creating new entries may be removed or the complexity of the computational task may be reduced.

In another embodiment, the blockchain system 104 may be a permission-less blockchain. A permission-less blockchain may be a blockchain where the nodes 102 are not previously authenticated or given permission to be included in the blockchain system. Thus, any node (e.g., any computing device, any server computer, etc.) may join the blockchain system and attempt to create entries in the ledger 133.

The blockchain system 104 may reach a consensus (e.g., a majority agreement) about the ledger 133 (e.g., the content of the ledger 133 or the content of the entries) using various functions, algorithms, operations, etc. For example, a Byzantine fault tolerance algorithm may be used by the nodes 102 to reach a consensus if different nodes have different versions of the ledger 133. In another example, the nodes 102 may rotate between each other when creating entries in the ledger 133. For example, after a period of time has passed, a node 102 that has not written to the ledger 133 may be allowed to create an entry in the ledger. This may be referred to as a proof of time or a proof of elapsed time system to allow nodes to update the ledger 133. In a further example, the nodes 102 may also provide collateral to be allowed to update the ledger 133. For example, an entity, company, organization, etc., that owns or manages the nodes 102 may pay a deposit to be allowed to be included in the blockchain system 104 and to access the ledger 133. The entity may be able to get the deposit back if the entity does not perform unauthorized or inappropriate operation/actions. For example, if the entity does not attempt to add incorrect information to the ledger 133, the entity may obtain a reward for its participation in maintaining and updating the ledger's information and may be able to recoup the deposit if the entity no longer wants to participate in the blockchain system 104. If the entity does attempt to add incorrect information to the ledger 133, the entity may lose the deposit. This may be referred to as a proof of stake system.

A node 102 may be a normal node or as a master node. While a normal node and a master node may both be electronic computing devices, a master node (sometimes referred to as, "a super node") may differ from a normal node in that a master node may have more computing resources (e.g., computing power, memory resources, networking bandwidth, storage space, etc.) than a normal node. Next to validating, saving and broadcasting transactions (which are the same operations performed by a normal node), a master node may also facilitate other events in the blockchain system 104 (or in a DLT network), such as governing voting events, providing execution of protocol operations, and enforcing the rules and/or laws of the corresponding blockchain system. Unlike a normal node, a master node may also maintain a constant, active connection with one or more nodes in the blockchain system. As such, a master node, in some embodiments, may consume more resources (e.g., electricity, up-time, maintenance, storage space, memory) than a normal node.

In some embodiments, a node 102 (e.g., node 102a, node 102b, node 102c, or node 102d) of the blockchain system 104 may be configured to send a request (shown in FIG. 1 as, "supply chain data request") to the supply chain data providers 110 for parameters (shown in FIG. 1 as, "supply chain data") that are associated with the supply chain of one or more products. In some embodiments, the request includes product identifiers corresponding to the one or more products. The request may cause the supply chain data providers 110 to provide one or more parameters (shown in FIG. 1 as, "supply chain data") to node 102, where the one or more parameters are associated with the supply chain of the one or more products corresponding to the product identifiers.

In some embodiments, a node 102 of the blockchain system 104 may be configured to determine (e.g., identify, ascertain), in view of the set of parameters, a first set of ethical issues associated with the supply chain of the product. For example, the one or more parameters may indicate the ages for the workers who manufactured a product. In this instance, the node 102 may determine, in view of the one or more parameters, that a majority of the workers had an average age that corresponds to that of a minor, according to a particular jurisdiction (e.g., per country or per state); thereby causing the node 102 to determine that the ethical issue associated with the manufacture of the product involves the use of child labor. As a further example, the one or more parameters may indicate the salaries for the workers who manufactured a product. In this instances, the node 102 may determine, in view of the one or more parameters, that the average salary for the workers is below a predetermined threshold (e.g., a minimum income necessary for a worker to meet their basic needs in a particular jurisdiction); thereby causing the node 102 to determine that the ethical issue associated with the manufacture of the product involves the use of child labor.

As a further example, the one or more parameters may indicate the number of electrical vehicles and the number of combustion-engine vehicles used to manufacture and/or deliver the product into the stream of commerce. In this instance, the node 102 may determine that the number of combustion-engine vehicles exceeds (e.g., violates) a predetermined threshold; thereby causing the node 102 to determine that the ethical issue associated with the manufacture of the product involves a negative impact on global warming. As a further example, the one or more parameters may indicate the quantity, type, and/or frequency of pesticide use during the manufacture of a product. In this instance, the node 102 may determine that the pesticide use exceeds a predetermined threshold and/or violates a rule (e.g., a government regulation); thereby causing the node 102 to determine that the ethical issue associated with the manufacture of the product involves a sustainable farming and/or animal husbandry practices. As a further example, the one or more parameters may indicate the one or more countries that were involved in the manufacture of a product. In this instance, the node 102 may determine that the one or more countries are known for supporting and/or allowing a company to force humans to work; thereby causing the node 102 to determine that the ethical issue associated with the manufacture of the product involves human trafficking.

In some embodiments, an ethical issue may be related to, for example, a size of a carbon footprint, child labor, a political structure of a company, drug and/or human trafficking, diversity-friendly programs, working wages, global warming, sustainable farming and/or animal husbandry practices, genetic manipulation (GMO), organic ingredients and/or components, products designed against planned obsolescence (e.g., promotes goods longevity), and products designed with user-configurable replacement parts.

In some embodiments, a node 102 of the blockchain system 104 may be configured to update the ledger 133 of a blockchain system 104 to indicate an association (e.g., a link) between the product identifier and one or more ethical issues that the blockchain system 104 (e.g., the node 102 or any other nodes 102 in the blockchain system 104) has determined to be associated with the supply chain of the product. For example, the node 102 may determine that the manufacturing of a product involved activities that negatively impact global warming, and in response, update the ledger 133 to indicate an association between the negative impact on global warming and the product identifier corresponding to the product. In some embodiments, a node 102 may update a ledger 133 of the blockchain system 104 by updating (e.g., creating, generating, populating) entries in its local copy of ledger 133 (e.g., the ledger 133 that is stored on the node 102) and then broadcasting the updated entries or one or more (e.g., all) portions of the updated ledger 133 to the other nodes in the blockchain system 104, which causes the other nodes to update their local copies of the ledger 133.

In some embodiments, a node 102 of the blockchain system 104 may be configured to determine a change (e.g., modification, adjustment) in the supply chain of a product. In some embodiments, the node 102 may determine an improvement, steadiness, or a decline in an ethical issue associated with the supply chain of a product. In some embodiments, the node 102 may obtain (e.g., receive, retrieve, fetch) a first set of one or more parameters associated with a product identifier. After an elapse of a predetermined time period (e.g., days, weeks, years, etc.), the node 102 may obtain (e.g., receive, retrieve, fetch) a second set of one or more parameters associated with the product identifier. In response, the node 102 may determine a change in the supply chain of the product. For example, the node 102 may receive a first set of one or more parameters that indicate that the average age for the workers who manufactured a product is below 12 years old. In response, the node 102 may determine, in view of the first set of one or more parameters, that the ethical issue associated with the manufacture of the product involves the use of child labor, and update the ledger 133 of blockchain system 104 to indicate an association between the product identifier and the use of child labor. A few months later, the node 102 may receive a second set of one or more parameters that indicate that the average age for the workers who manufactured the product has increased to 16 years old. In response, the node 102 may determine, in view of the second set of one or more parameters, that the manufacture of the product no longer involves the use of child labor. Therefore, the node 102 may update the ledger 133 to indicate that child labor is no longer used to manufacture the product.

In some embodiments, a node 102 of the blockchain system 104 may be configured to determine an association between a product identifier and an EP management system. In some embodiments, the node 102 may send, to an EP management system responsive to determining the association between the first product identifier and the EP management system, a message indicating a linkage between the first product identifier and one or more ethical issues associated with the supply chain of the product. For example, EP management systems 106a, 106b may each maintain a continuous or periodic connection with the blockchain system 104, where EP management system 106a is managed by company 108a and EP management system 106b is managed by company 108b. A node 102 of the blockchain system 104 may determine that the ledger 133 includes information about a product identifier that corresponds to a product (e.g., a television) that is advertised and/or sold by company 108a. In response, the node 102 may generate a message that indicates that the product (e.g., the television) is associated with one or more ethical issues. In some embodiments, the node 102 may send the message to the EP management system 106a responsive to determining that the company 108a is associated (e.g., controls) with the EP management system 106a. In some embodiments, the node 102 may determine to not send the message to the EP management system 106b responsive to determining that the company does not have control over the EP management system 106b.

In some embodiments, the EP management systems 106a, 106b may each be configured to send a request (shown in FIG. 1 as, "blockchain data request") to the blockchain system 104 (e.g., to any of the nodes 102) for blockchain data associated with a product, where the request includes a product identifier to the product. In some embodiments, the EP management systems 106a, 106b may each be configured to receive, from the blockchain system 104, a message indicating a linkage between a product identifier and one or more ethical issues associated with a supply chain of a product corresponding to the product identifier.

In some embodiments, the EP management systems 106a, 106b may each be configured to obtain user preference data from a client device 122. For example, the EP management system 106a may receive user preference data associated with a user of a client device 122a, where the client device 122a sends the user preference data to the EP management system 106a via an application that is executing on the client device 122a. In some embodiments, the user preference data is associated with an account of the user, where the account is managed by the company (e.g., company 108a) that is associated with the EP management system (e.g., EP management system 106a). In some embodiments, the user preference data indicates an importance level (e.g., high, medium, low) of an ethical issue to a user. In some embodiments, the user preference data indicates whether to filter (e.g., remove) an ethical issue from a set of ethical issues before presenting ethical issues to a client device.

In some embodiments, the EP management systems 106a, 106b may each be configured to receive a request (shown in FIG. 1 as, "application data") from a client device for one or more ethical issues associated with a product. In some embodiments, the request includes a product identifier corresponding to the product. In some embodiments, the request may be sent by the client device responsive to the client device scanning a quick response (QR) code associated with the product identifier or a barcode associated with the product identifier.

In some embodiments, the EP management systems 106a, 106b may each be configured to determine a score for one or more of the ethical issues of a set of ethical issues that are associated with the supply chain of the product. For example, the EP management system 106a may receive a set of ethical issues from the blockchain system 104, where the set of ethical issues indicate that the manufacturing of a product is associated with child labor issues and sustainable farming issues. In response, the EP management system 106a may assign a first score to the child labor issues and a second score to the sustainable farming issues. In some embodiments, the EP management systems 106a, 106b may each be configured to determine a score for one or more ethical issues in view of the user preference data. For example, the user preference data may indicate that the user of a client device 122a is more concerned about whether a company used child labor in manufacturing a product than whether the company used sustainable farming practices in manufacturing the product. As such, the EP management system 106a may determine and/or assign a first score to the company's use of child labor according to a first rule that is stricter than a second rule that the EP management system 106a uses to determine (and assign) the second score to the company's use (or lack of) of sustainable farming practices.

In some embodiments, the EP management systems 106a, 106b may each be configured to send, responsive to receiving a request for one or more ethical issues associated with a product, a message (shown in FIG. 1 as, "application data") to a client device (e.g., client device 122a, client device 122b). In some embodiments, the message includes one or more scores and one or more ethical issues, where a respective score of the one or more scores is linked to a respective ethical issue of the one or more ethical issues. In some embodiments, the message causes the client device to present the one or more scores and the one or more ethical issues in an application that is executing on the client device. In some embodiments, the client device presents (in an application executing on the client device) a score that is associated with an ethical issue, such that the user of the client device understands that the score is associated with the ethical issue. For example, the client device may present the score adjacent to the ethical issue.

In some embodiments, the EP management systems 106a, 106b may each be configured to select a subset of ethical issues from a set of ethical issues according to the user preference data. For example, the EP management system 106a may determine that a product identifier is associated with three ethical issues (e.g., child labor, global warming, organics) in the ledger 133, but that the user preference data indicates that the user is only interested in two of the ethical issues (e.g., child labor, global warming). In response to the determination, the EP management system 106a may select the two ethical issues (e.g., child labor, global warming), determine scores for the two ethical issues, and send a message to the client device indicating the scores for the two ethical issues.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between the nodes 102 and any other computing device.

Although FIG. 1 shows only a select number of computing devices (e.g., blockchain system 104, node 102a, node 102b, node 102c, node 102d, EP management system 106a, EP management system 106b, supply chain data providers 110) and databases (e.g., blockchain data storage 114a, blockchain data storage 114b); the environment 100 may include any number of computing devices and/or databases that are interconnected in any arrangement to facilitate the exchange of data between the computing devices. The environment 100 may also include any number of companies (e.g., company 108a, company 108b, etc.) to manage or operate the additional EP management systems 106.

Figure 2B:
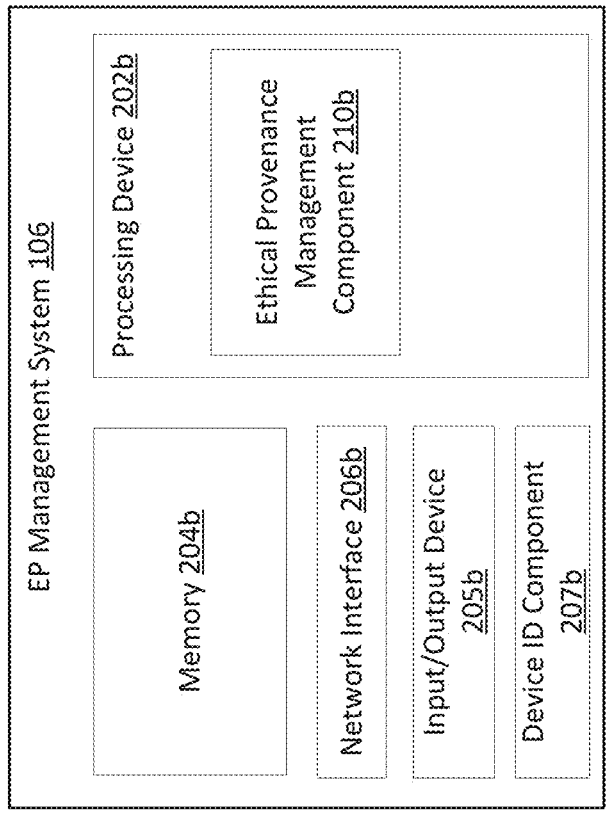
FIG. 2B is a block diagram depicting an example of an EP management system of the environment in FIG. 1, according to some embodiments.
Figure 2A:
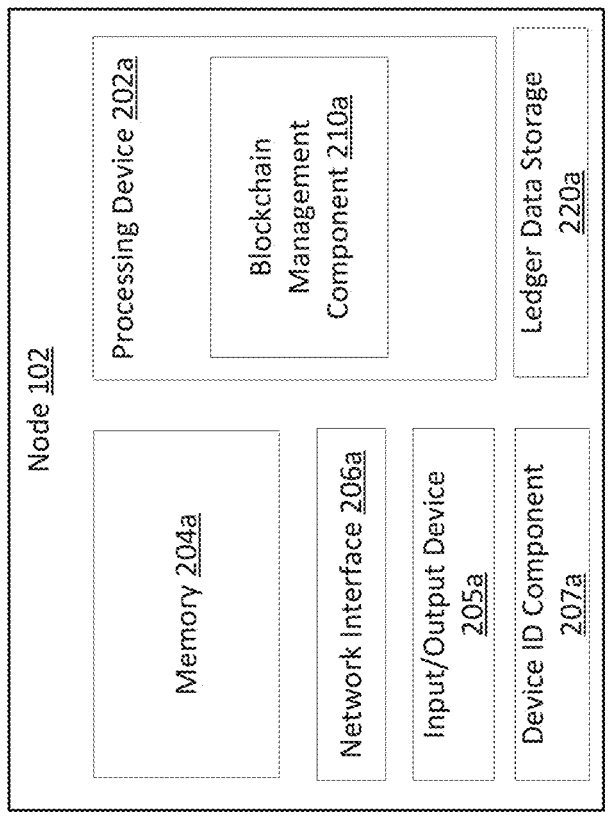
FIG. 2A is a block diagram depicting an example of a blockchain system of the environment in FIG. 1, according to some embodiments.

FIG. 2A is a block diagram depicting an example of a node of the blockchain system in FIG. 1, according to some embodiments. While various devices, interfaces, and logic with particular functionality are shown, it should be understood that the one or more nodes 102 (e.g., nodes 102a-102d) of the blockchain system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The node 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the node 102. In some embodiments, the processing device 202a and the memory 204a form various processing devices and/or circuits described with respect to the node 102. The instructions include code from any suitable computer programming language such as, but not limited to, C, C++, C#, Java, JavaScript, VBScript, Perl, HTML, XML, Python, TCL, and Basic.

The processing device 202a may execute a blockchain management component 210a. The blockchain management component 210a may be configured to obtain (e.g., retrieve, gather, receive) a product identifier and/or a first set of parameters associated with the product identifier, each parameter indicative of a supply chain of a product corresponding to the product identifier. In some embodiments, the blockchain management component 210a may be configured to determine, in view of the set of parameters, a first set of ethical issues associated with the supply chain of the product. In some embodiments, the blockchain management component 210a may be configured to update a ledger (e.g., ledger 133) of a blockchain system to indicate an association between the product identifier and the first set of ethical issues associated with the supply chain of the product.

In some embodiments, the blockchain management component 210a may be configured to send, to a computing device, a request for one or more parameters associated with the supply chain of the product. In some embodiments, the blockchain management component 210a may be configured to receive, responsive to sending the request, the first set of parameters.

In some embodiments, the blockchain management component 210a may be configured to obtain a second set of parameters associated with the product identifier, each parameter indicative of the supply chain of the product corresponding to the product identifier. In some embodiments, the blockchain management component 210a may be configured to determine, in view of the second set of parameters, a change in the supply chain of the product. In some embodiments, the blockchain management component 210a may be configured to determine, responsive to determining the change in the supply chain of the product, an additional ethical issue associated with the supply chain of the product. In some embodiments, the blockchain management component 210a may be configured to update the ledger of the blockchain system to indicate an association between the product identifier and the additional ethical issue associated with the supply chain of the product.

In some embodiments, the blockchain management component 210a may be configured to determine, responsive to determining the change in the supply chain of the product, an improvement, steadiness, or decline in the first set of ethical issues associated with the supply chain of the product. In some embodiments, the blockchain management component 210a may be configured to update the ledger of the blockchain system to indicate the improvement, steadiness, or decline in the first set of ethical issues associated with the supply chain of the product.

In some embodiments, the blockchain management component 210a may be configured to determine an association between the first product identifier and an EP management system (e.g., EP management system 106a). In some embodiments, the blockchain management component 210a may be configured to send, to an EP management system responsive to determining the association between the first product identifier and the EP management system, a message indicating a linkage between the first product identifier and the first set of ethical issues associated with the supply chain of the product. In some embodiments, the sending of the message by the blockchain management component 210a causes an EP management system to determine a score for each of the first set of ethical issues associated with the supply chain of the product, each of the scores are indicative of an importance level according to a user preference. In some embodiments, the sending of the message by the blockchain management component 210a causes the EP management system to present each of the scores via an application executing on the client device.

In some embodiments, the blockchain management component 210a may determine, in view of the ledger of a blockchain system, an association between a second product identifier and a second set of ethical issues associated with a supply chain of a second product corresponding to the second product identifier. In some embodiments, the blockchain management component 210a may send, to a management system, a message indicating a linkage between the second product identifier and the second set of ethical issues associated with the supply chain of the product.

The node 102 includes a ledger data storage 220a configured to store the ledger 133 (or copies thereof). The ledger data storage 210a may be a persistent storage, such that the ledger data storage 220 retains the data (e.g., ledger 133) even after power to the data storage is shut off. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices. In some embodiments, the node 102 may store the ledger (or copies thereof) in the memory 204a.

The node 102 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the node 102 includes a plurality of network interfaces 206a of different types, allowing for connections to a variety of networks, such as local area networks (public or private) or wide area networks including the Internet, via different sub-networks.

The node 102 includes an input/output device 205a configured to receive user input from and provide information to a user. In this regard, the input/output device 205a is structured to exchange data, communications, instructions, etc. with an input/output component of the node 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of node 102, such as a built-in display, touch screen, microphone, etc., or external to the housing of node 102, such as a monitor connected to node 102, a speaker connected to node 102, etc., according to various embodiments. In some embodiments, the input/output device 205a includes communication circuitry for facilitating the exchange of data, values, messages, and the like between the input/output device and the components of the node 102. In some embodiments, the input/output device 205a includes machine-readable media for facilitating the exchange of information between the input/output device and the components of the node 102. In still another embodiment, the input/output device 205a includes any combination of hardware components (e.g., a touchscreen), communication circuitry, and machine-readable media.

The node 102 includes a device identification component 207a (shown in FIG. 2A as device ID component 207a) configured to generate and/or manage a device identifier associated with node 102. The device identifier may include any type and form of identification used to distinguish the node 102 from other computing devices. In some embodiments, to preserve privacy, the device identifier may be cryptographically generated, encrypted, or otherwise obfuscated by any device and/or component of node 102. In some embodiments, the node 102 may include the device identifier in any communication (e.g., a request, blockchain data, supply chain data request, etc.) that the node 102 sends to a computing device.

The node 102 includes a bus (not shown), such as an address/data bus or other communication mechanism for communicating information, which interconnects the devices and/or components of node 102, such as processing device 202a, network interface 206a, input/output circuit 205a, device ID component 207a, and blockchain management component 210a.

In some embodiments, some or all of the devices and/or components of node 102 may be implemented with the processing device 202a. For example, the blockchain management component 210a may be implemented as a software application stored within the memory 204a and executed by the processing device 202a. Accordingly, such embodiment can be implemented with minimal or no additional hardware costs. In some embodiments, any of these above-recited circuits rely on dedicated hardware specifically configured for performing operations of the circuit.

FIG. 2B is a block diagram depicting an example of an EP management system 106 (e.g., EP management system 106a, EP management system 106b) of the environment in FIG. 1, according to some embodiments. While various devices, interfaces, and logic with particular functionality are shown, it should be understood that the EP management systems 106 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The EP management system 106 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the EP management system 106 instead of devices and/or components of the node 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the EP management system 106 instead of devices and/or components of the node 102.

The processing device 202b may execute an ethical provenance (EP) management component 210b that may be configured to receive, from the blockchain system 104, a first message indicating a linkage between a product identifier and a set of ethical issues associated with a supply chain of a product corresponding to the product identifier. In some embodiments, the EP management component 210b may be configured to receive, from a client device (e.g., client device 122a, client device 122b), a request for one or more ethical issues associated with the product identifier.

In some embodiments, the EP management component 210b may be configured to determine a score for each ethical issue of the set of ethical issues associated with the supply chain of the product corresponding to the product identifier. In some embodiments, the EP management component 210b may be configured to send, to the client device, a second message to cause the score for each ethical issue of at least one ethical issue of the set of ethical issues to be presented in an application executing on the client device. In some embodiments, each of the scores may be indicative of an importance level according to user preference data.

In some embodiments, the EP management component 210b may be configured to obtain the user preference data from an account associated with the client device. In some embodiments, the EP management component 210b may be configured to select the at least one ethical issue of the first set of ethical issues according to the user preference data.

In some embodiments, the EP management component 210b may be configured to receive, a client device, a second request for information about an additional ethical issue associated with the supply chain of the product that is absent from the first set of ethical issues. In some embodiments, the EP management component 210b may be configured to send, to the blockchain system 104, a second message indicating the second request for the information about the additional ethical issue. In some embodiments, the second message may cause the blockchain system 104 to update the ledger of the blockchain system to indicate an association between the product identifier and the additional ethical issue associated with the supply chain of the product. In some embodiments, the EP management component 210b may be configured to receive the request from the client device responsive to the client device scanning a quick response (QR) code associated with the product identifier or a barcode associated with the product identifier.

In some embodiments, an ethical issue may be indicative of at least one of a carbon footprint size, child labor practices, a political structure, drug or human trafficking, diversity-friendly practices, working wages, an impact on global warming, sustainable farming and animal husbandry practices, genetic manipulation (GMO) practices, organic practices, or product longevity and planned obsolescence.

The EP management system 106 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the EP management system 106 instead of devices and/or components of the node 102.

The EP management system 106 includes an input/output device 205b configured to receive user input from and provide information to a user. In this regard, the input/output device 205b is structured to exchange data, communications, instructions, etc. with an input/output component of the EP management system 106. The input/output device 205b includes identical or nearly identical functionality as input/output processor 205a in FIG. 2A, but with respect to devices and/or components of the EP management system 106 instead of devices and/or components of the node 102.

The EP management system 106 includes a device identification component 207b (shown in FIG. 2B as device ID component 207b) configured to generate and/or manage a device identifier associated with the EP management system 106. The device ID component 207b includes identical or nearly identical functionality as device ID component 207a in FIG. 2A, but with respect to devices and/or components of the EP management system 106 instead of devices and/or components of the node 102.

The EP management system 106 includes a bus (not shown), such as an address/data bus or other communication mechanism for communicating information, which interconnects the devices and/or components of the EP management system 106, such as processing device 202b, network interface 206b, input/output circuit 205b, device ID component 207b, and the EP management device 210b.

In some embodiments, some or all of the devices and/or components of EP management system 106 may be implemented with the processing device 202b. For example, the EP management system 106 may be implemented as a software application stored within the memory 204b and executed by the processing device 202b. Accordingly, such embodiment can be implemented with minimal or no additional hardware costs. In some embodiments, any of these above-recited circuits rely on dedicated hardware specifically configured for performing operations of the circuit.

Figure 2C:
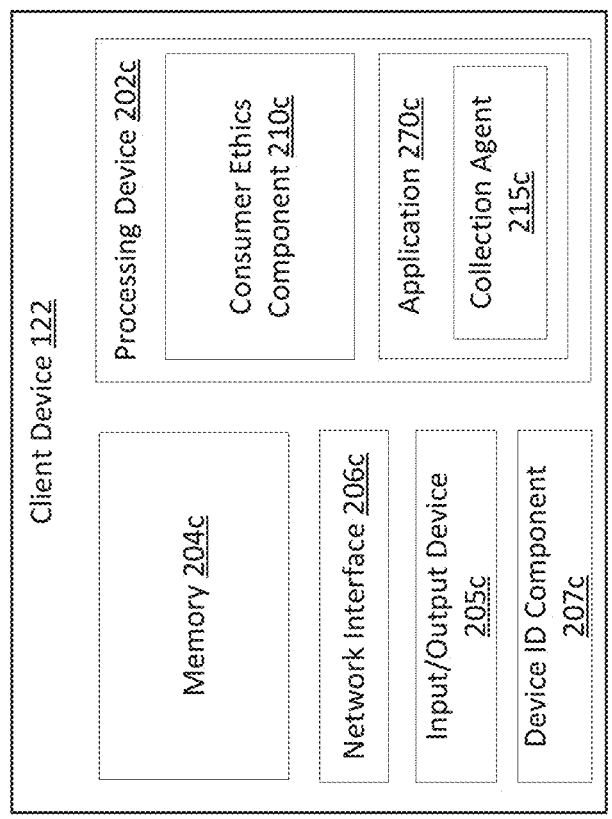
FIG. 2C is a block diagram depicting an example of a client device of the environment in FIG. 1, according to some embodiments.

FIG. 2C is a block diagram depicting an example of a client device 122 (e.g., client device 122a, client device 122b) of the environment in FIG. 1, according to some embodiments. While various devices, interfaces, and logic with particular functionality are shown, it should be understood that the client device 122 includes any number of devices and/or components, interfaces, and logic for facilitating the functions described herein. For example, the activities of multiple devices may be combined as a single device and implemented on a same processing device (e.g., processing device 202c), as additional devices and/or components with additional functionality are included.

The client device 122 includes a processing device 202c (e.g., general purpose processor, a PLD, etc.), which may be composed of one or more processors, and a memory 204c (e.g., synchronous dynamic random access memory (DRAM), read-only memory (ROM)), which may communicate with each other via a bus (not shown). The processing device 202c includes identical or nearly identical functionality as processing device 202a in FIG. 2a, but with respect to devices and/or components of the client device 122 instead of devices and/or components of the node 102.

The memory 204c of processing device 202c stores data and/or computer instructions/code for facilitating at least some of the various processes described herein. The memory 204c includes identical or nearly identical functionality as memory 204a in FIG. 2A, but with respect to devices and/or components of the client device 122 instead of devices and/or components of the node 102.

The client device 122 includes a network interface 206c configured to establish a communication session with a computing device for sending and receiving data over a network to the computing device. Accordingly, the network interface 206c includes identical or nearly identical functionality as network interface 206a in FIG. 2A, but with respect to devices and/or components of the client device 122 instead of devices and/or components of the node 102.

The client device 122 includes an input/output device 205c configured to receive user input from and provide information to a user. In this regard, the input/output device 205c is structured to exchange data, communications, instructions, etc. with an input/output component of the client device 122. The input/output device 205c includes identical or nearly identical functionality as input/output processor 205a in FIG. 2A, but with respect to devices and/or components of the client device 122 instead of devices and/or components of the node 102.

The client device 122 includes a device identification component 207c (shown in FIG. 2C as device ID component 207c) configured to generate and/or manage a device identifier associated with the client device 122. The device ID component 207c includes identical or nearly identical functionality as device ID component 207a in FIG. 2A, but with respect to devices and/or components of the EP management system 106 instead of devices and/or components of the node 102.

The processing device 202c may execute an application 270c that is communicably coupled to communication network 120 allowing the client device 122 to send/receive data (e.g., requests, client data, application data, user inputted data, etc.) to any other computing devices connected to the communication network 120. The application 270c is configured to display information (e.g., application data, scores, ethical issues, account information, etc.) that the client device 122 receives from any other computing device (e.g., EP management system 106). The application 270c may be an internet/web browser, a graphic user interface (GUI), an email reader/client, a File Transfer Protocol (FTP) client, a virtual machine application, or a software application that is separate from an internet/web browser.

The application 270c includes a collection agent 215c. The collection agent 215c may include an application plug-in, application extension, subroutine, browser toolbar, daemon, or other executable logic for collecting data processed by the application 270c and/or monitoring interactions of user with the input/output circuit 205c. In other embodiments, the collection agent 215c may be a separate application, service, daemon, routine, or other executable logic separate from the application 270c but configured for intercepting and/or collecting data processed by application 270c, such as a screen scraper, packet interceptor, application programming interface (API) hooking process, or other such application. The collection agent 215c is configured for intercepting or receiving data input via the input/output circuit 205c, including mouse clicks, scroll wheel movements, gestures such as swipes, pinches, or touches, or any other such interactions; as well as data received and processed by the application 270c. The collection agent 215c is configured to pass any data that it intercepts, gathers, and/or receives data to the application 270c to be presented in the application 207 (e.g., on a display/monitor) and/or for the application to sends the data to the EP management system 106a.

The collection agent 215c, may begin intercepting, gathering, and/or receiving data input via its respective input/output circuit in view of any triggering event, including, e.g., a power-up of the client device 122 or a launch of any software application executing on a processing device of client device 122. In some embodiments, the collection agent 215c may begin intercepting, gathering, and/or receiving data responsive to a user scanning a quick response (QR) code associated with a product identifier or a barcode associated with a product identifier.

The processing device 202c may execute a consumer ethics component 210c. In some embodiments, the consumer ethics component 210c may be configured to send (e.g., deliver, provide, transmit), to an EP management system 106, a request for one or more ethical issues associated with a product identifier. In some embodiments, the consumer ethics device 210c may be configured to receive, from the EP management system 106, a message that includes one or more scores and ethical issues associated with each score. In response to receiving the message, the client device 122 may present (e.g., display) the one or more scores and ethical issues in the application 270c.

In some embodiments, the consumer ethics component 210c may be configured to determine and/or capture a product identifier responsive to the client device 122 scanning (e.g., via a camera on the client device 122) a quick response (QR) code or barcode associated (e.g., on a tag, on a sticker, on a sign near the product, etc.) with a product. In some embodiments, responsive to scanning the QR code or bar code, the consumer ethics component 210c may send the request for one or more ethical issues associated with a product identifier, where the request includes the product identifier.

In some embodiments, the consumer ethics component 210c may be configured to send, to the EP management system 106, a second request for information about an additional ethical issue associated with the supply chain of the product that is absent from the first set of ethical issues.

The consumer ethics component 210c includes a bus (not shown), such as an address/data bus or other communication mechanism for communicating information, which interconnects the devices and/or components of the client device 122, such as processing device 202c, network interface 206c, input/output circuit 205c, device ID component 207c, the application 270c, and the consumer ethics component 210c.

In some embodiments, some or all of the devices and/or components of the client device 122 may be implemented with the processing device 202c. For example, the client device 122 may be implemented as a software application stored within the memory 204c and executed by the processing device 202c. Accordingly, such embodiment can be implemented with minimal or no additional hardware costs.

In some embodiments, any of these above-recited circuits rely on dedicated hardware specifically configured for performing operations of the circuit.

Figure 2D:
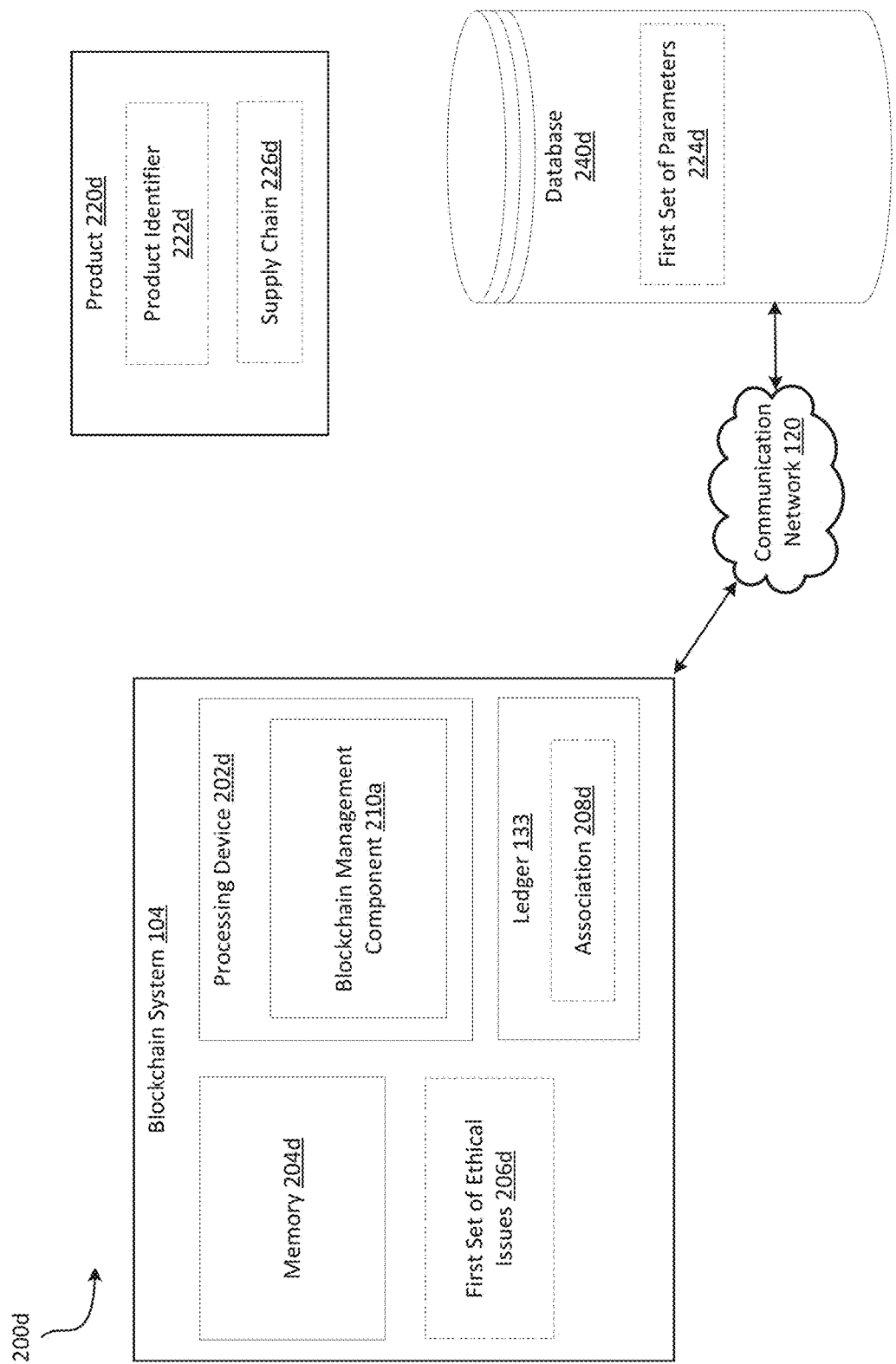
FIG. 2D is a block diagram of an example environment of a blockchain provenance system, according to some embodiments.

FIG. 2D is a block diagram of an example environment of a blockchain system, according to some embodiments. The environment 200d includes a communication network 120, a product 220d, a database 240d, and the blockchain system 104 in FIG. 1. The product 220d may be associated with a product identifier 222d. The product 220d may be associated with a supply chain 226d that was used to manufacture the product. The database 240d includes a first set of parameters 224d that are associated with product 220d.

As previously discussed, the blockchain system 104 includes a processing device 202d (e.g., general purpose processor, a PLD, etc.), which may be composed of one or more processors, and a memory 204d (e.g., synchronous dynamic random access memory (DRAM), read-only memory (ROM)), which may communicate with each other via a bus (not shown). The processing device 20dc includes identical or nearly identical functionality as processing device 202a in FIG. 2a, but with respect to devices and/or components of the blockchain system 104 instead of devices and/or components of the node 102. The blockchain system 104 may include the ledger 133.

The memory 204c of processing device 202d stores data and/or computer instructions/code for facilitating at least some of the various processes described herein. The memory 204d includes identical or nearly identical functionality as memory 204a in FIG. 2A, but with respect to devices and/or components of the blockchain system 104 instead of devices and/or components of the node 102.

The processing device 202d may execute a blockchain management component 210d. The blockchain management component 210d may be configured to fetch (e.g., retrieve, gather, receive) the product identifier 222d and/or the first set of parameters 206d associated with the product identifier 222d from the database 240d via the communication network 120. In some embodiments, each parameter of the first set of parameters 224d may be indicative of the supply chain 226d of the product 220d. In some embodiments, the blockchain management component 210d may be configured to determine, in view of the set of parameters 224d, a first set of ethical issues 206d associated with the supply chain 226d of the product 220d. In some embodiments, the blockchain management component 210d may be configured to update the ledger 133 of a blockchain system 104 to indicate an association 208d between the product identifier 222d and the first set of ethical issues 206d associated with the supply chain 226d of the product 220d.

It should be noted that, in some embodiments, first set of ethical issues 206d, association 208d, product identifier 222d, first set of parameters 224d, and/or supply chain 226d are shown for illustrative purposes only, in that they are not physical components.

FIG. 3 is a graphical user interface (GUI) of an example application depicting a method for displaying ethical issues associated with the supply chain of a product and corresponding scores, according to some embodiments. The application 300 may be application 270c in FIG. 2C that executes on client device 122. The application 300 includes a region 302 (entitled "Scanned Product Description") for displaying a product description of a scanned product. The region 302 may include the Brand Name of the scanned product, the Model Number of the scanned product, or any other descriptive information about the scanned product. As discussed herein, a scanned product may be one in which a user of a client device 122 scans a feature (e.g., a QR code or a bar code) on a tag of the product by using a camera on the client device 122, such that the client device 122 may extract the product description from the scanned feature or use the information that is extracted from the scanned feature to retrieve (e.g., fetch) the product description from a remote server.

The application 300 includes a region 303 (entitled "Product Ethicality Report") for displaying a product ethicality report about the scanned product. The region 303 shows a badge 304 that includes a description of an ethical issue (e.g., "Carbon Footprint") and an associated score (e.g., "A"), a badge 306 that includes a description of an ethical issue (e.g., "Child Labor") and an associated score (e.g., "F"), a badge 308 that includes a description of an ethical issue (e.g., "Anima Testing") and an associated score (e.g., "D"), and a badge 310 that includes a description of an ethical issue (e.g., "Sustainable Farming and Animal Husbandry") and an associated score (e.g., "B"). In some embodiments, the region 303 may include (e.g., show) any number of scores for any number of ethical issues.

The application 300 includes a region 313 (entitled "Customization Filter Report") for displaying several options for the user to configure when interacting with the application 300. The region 313 shows a first column (entitled, "Ethical Issues") 312 that includes a list of ethical issues that are associated with the scanned product. As shown, these ethical issues may include carbon footprint, child labor, animal testing, drug and/or human trafficking, political structure, working wages, global warming, sustainable farming and animal husbandry, and genetic manipulation (GMO). The region 313 includes a vertical scrollbar 315 allowing a user to scroll through any number ethical issues that are populated in application 300. In some embodiments, the region 313 may include (e.g., show) any number of ethical issues.

The region 313 includes a second column (entitled, "Enabled") 314 that includes a plurality of drop-down options, where each drop-down option corresponds to a respective ethical issue of the plurality of ethical issues. The user may configure (e.g., select) any of the drop-down menus in the second column 314 as "Yes" to indicate that the user is requesting for the EP management system 106 to provide a score for the associated ethical issue, or "No" to indicate that the user is requesting for the EP management system 106 to not provide (e.g., filter, omit, delete) a score for the associated ethical issue. In some embodiments, the application 300 may include (e.g., embed) information in the user preference data (as discussed herein) that indicates the user's configuration for the drop-down menus in the second column 314 and the drop-down menus in the third column 316, for each of the ethical issues in the first column 312.

The region 313 includes a third column (entitled, "Importance Level") 316 that includes a plurality of drop-down options, where each drop-down option corresponds to a respective ethical issue of the plurality of ethical issues. The user may configure any of the drop-down menus in the third column 316 as "High" to indicate that the user is requesting for the EP management system 106 to assign a score to an ethical issue associated with the scanned product according to a first rule, "Medium" to indicate that the user is requesting for the EP management system 106 to assign a score to an ethical issue associated with the scanned product according to a second rule, or "Low" to indicate that the user is requesting for the EP management system 106 to assign a score to an ethical issue associated with the scanned product according to a third rule. In some embodiments, the first rule is the strictest rule, the third rule is the least strict rule, and the second rule is in between the first rule and the second rule. In some embodiments, an increase in a strictness of a rule is inversely related to the ranking of the score that an EP management system 106 assigns to an ethical issue. For example, an EP management system 106 may discover that the average age of the workers who manufactured a product is 14 and that the minimum working age in the jurisdiction in which the product was manufactured is 15. In this instance, the EP management system 106 may assign an 'F' score (a failing score) to the product identifier for the use of child labor if the user selected "High" because the average age is below the minimum age. However, the EP management system 106 may assign a 'B' score (a passing score) to the product identifier because the average age of the workers is only 1 year below the minimum age. That is, the user may adjust the settings in the third column 316 of region 313 to adjust the leniency or strictness of the determinations that are made by the EP management system 106 when assigning scores to ethical issues.

The application 300 includes a region 319 (entitled "Custom Request Tool") that includes an entry field 318 and a button 320 (entitled, "Submit Request"). If a user would like to see a score for an ethical issue that is not currently available in region 313, then the user may enter the ethical issue in entry field 318. The user may select button 320, which causes the client device 122, via the application 300, to send a message to the EP management system 106 and/or the blockchain system 104, where the message includes the information from the entry field 318. The message indicates that the user is requesting for the application to present a score about an additional ethical issue (as indicated in entry field 318) that is not currently shown in the application 300. In some embodiments, the message may cause the blockchain system 104 to update the ledger of the blockchain system 104 to indicate an association between the product identifier and the additional ethical issue associated with the supply chain of the product. In some embodiments, the message may cause the blockchain system 104 to send updated blockchain data to the EP management system 106, where the updated blockchain data includes information about the additional ethical issue.

Figure 4:
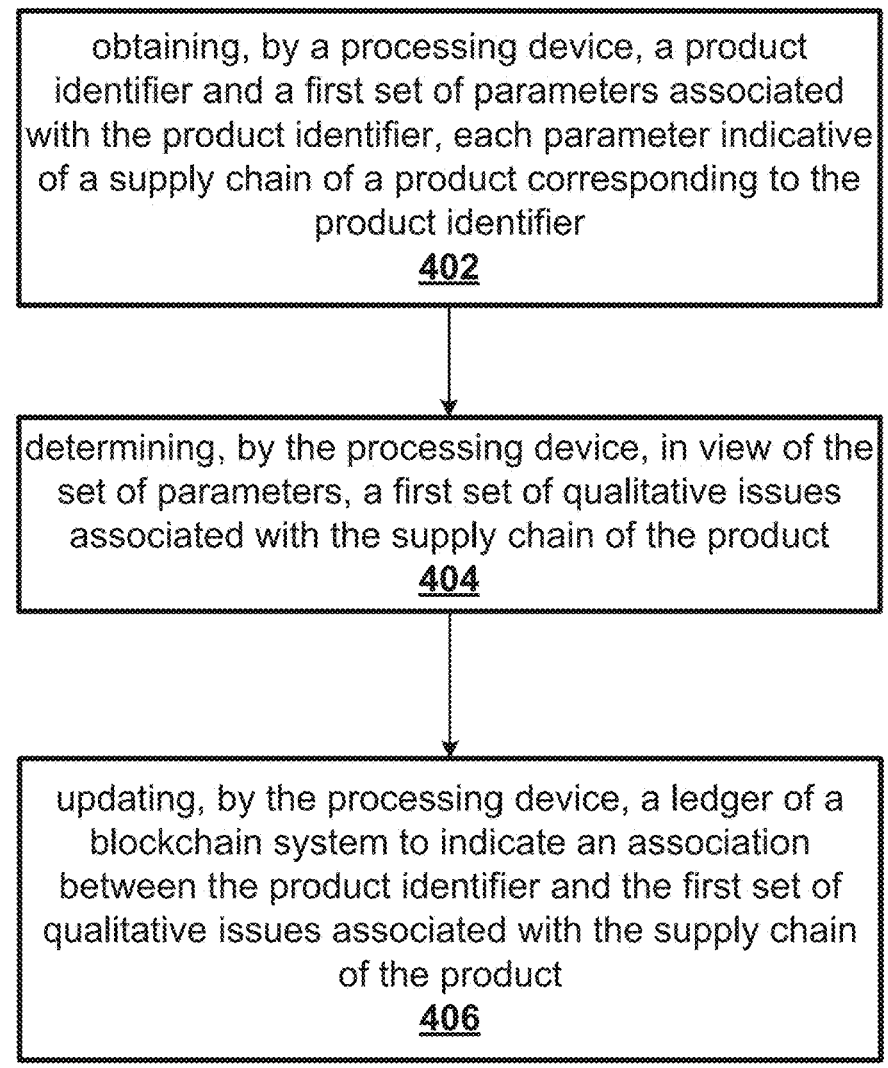
FIG. 4 is a flow diagram depicting a method for using a blockchain to determine and/or track the ethical issues associated with the supply chain of one or more products, according to some embodiments.

FIG. 4 is a flow diagram depicting a method for using a blockchain to determine and/or track the qualitative (e.g., ethical) issues associated with the supply chain of one or more products, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by one or more nodes of a blockchain system, such as nodes 102a, node 102b, node 102c, and/or node 102d of blockchain system 104 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of obtaining a product identifier and a first set of parameters associated with the product identifier, each parameter indicative of a supply chain of a product corresponding to the product identifier. The method 400 includes the block 404 of determining, in view of the set of parameters, a first set of qualitative issues associated with the supply chain of the product. The method 400 includes the block 406 of updating a ledger of a blockchain system to indicate an association between the product identifier and the first set of qualitative issues associated with the supply chain of the product.

Figure 5:
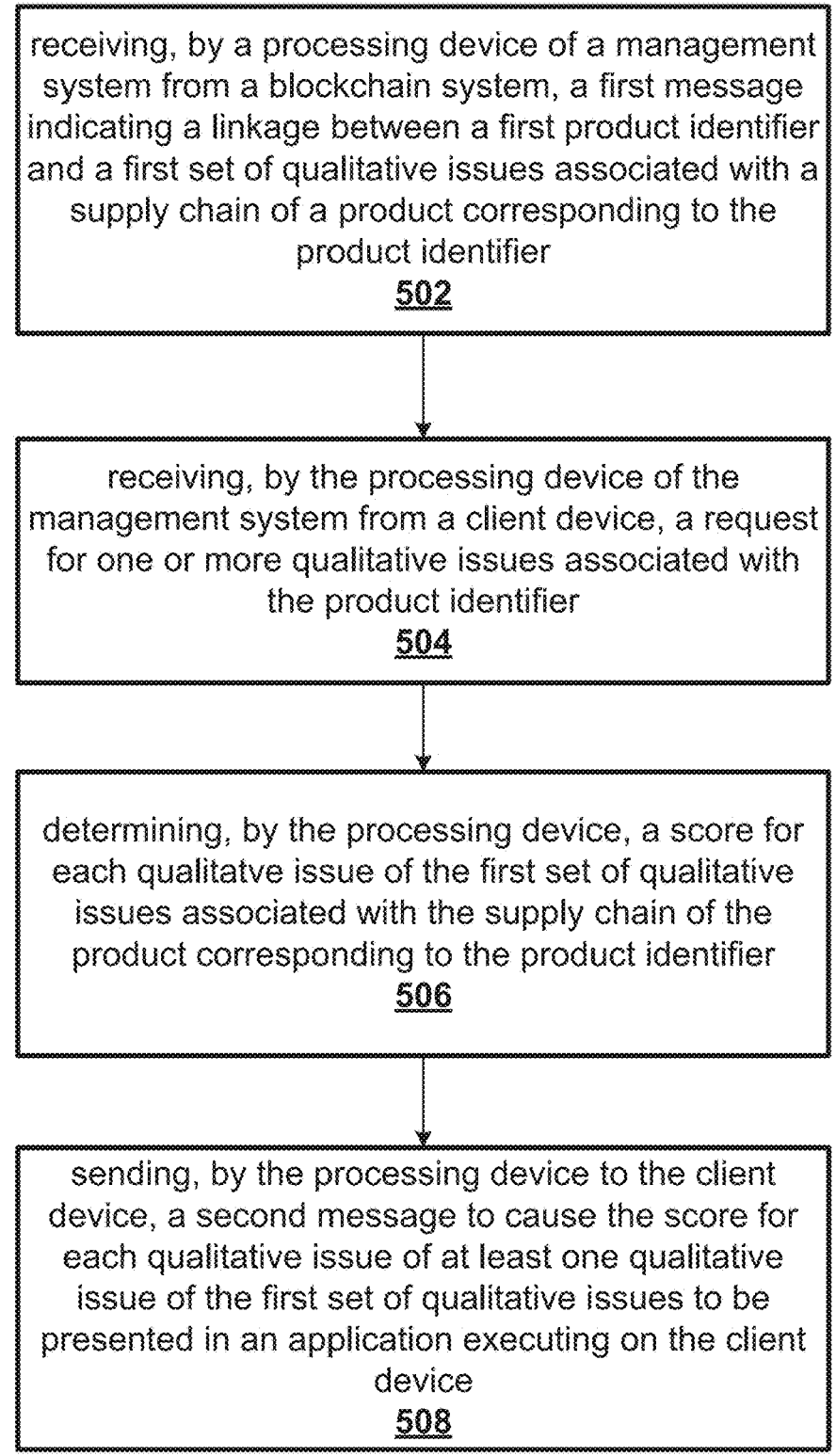
FIG. 5 is a flow diagram depicting a method for using a blockchain to determine and/or track the ethical issues associated with the supply chain of one or more products, according to some embodiments.

FIG. 5 is a flow diagram depicting a method for using a blockchain to determine and/or track the qualitative (e.g., ethical) issues associated with the supply chain of one or more products, according to some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 500 may be performed by one or more EP management systems, such as EP management system 106a and/or EP management system 106b in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of receiving, by a processing device of a management system from a blockchain system, a first message indicating a linkage between a first product identifier and a first set of qualitative issues associated with a supply chain of a product corresponding to the product identifier. The method 500 includes the block 504 of receiving, by the processing device of the management system from a client device, a request for one or more qualitative issues associated with the product identifier. The method 500 includes the block 506 of determining, by the processing device, a score for each qualitative issue of the first set of qualitative issues associated with the supply chain of the product corresponding to the product identifier. The method 500 includes the block 506 of sending, by the processing device to the client device, a second message to cause the score for each qualitative issue of at least one qualitative issue of the first set of qualitative issues to be presented in an application executing on the client device.

Figure 6:
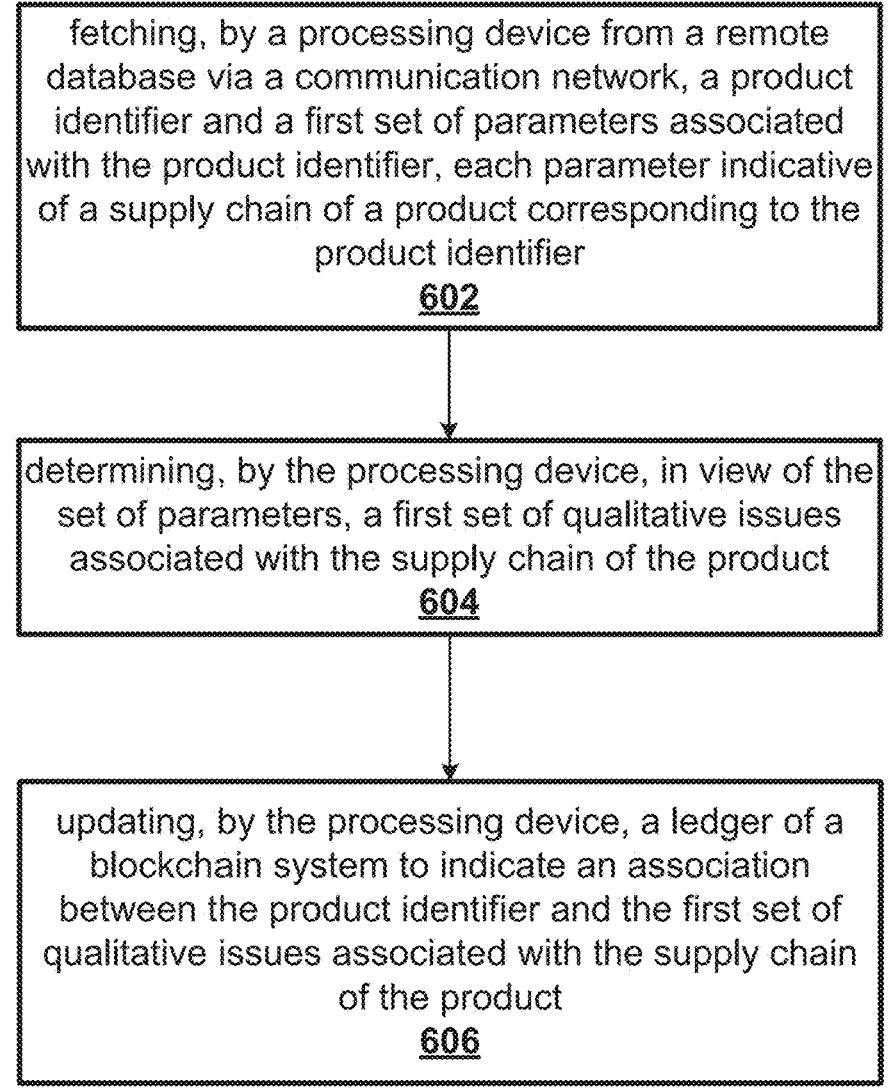
FIG. 6 is a flow diagram depicting a method for using a blockchain to determine and/or track the ethical issues associated with the supply chain of one or more products, according to some embodiments.

FIG. 6 is a flow diagram depicting a method for using a blockchain to determine and/or track the qualitative (e.g., ethical) issues associated with the supply chain of one or more products, according to some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by one or more nodes of a blockchain system, such as nodes 102a, node 102b, node 102c, and/or node 102d of blockchain system 104 in FIG. 1.

With reference to FIG. 6, method 600 illustrates example functions used by various embodiments. Although specific function blocks ("blocks") are disclosed in method 500, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

As shown in FIG. 6, the method 600 includes the block 602 of fetching, by a processing device from a remote database via a communication network, a product identifier and a first set of parameters associated with the product identifier, each parameter indicative of a supply chain of a product corresponding to the product identifier. The method 600 includes the block 604 of determining, by the processing device, in view of the set of parameters, a first set of qualitative issues associated with the supply chain of the product. The method 600 includes the block 606 of updating, by the processing device, a ledger of a blockchain system to indicate an association between the product identifier and the first set of qualitative issues associated with the supply chain of the product.

Figure 7:
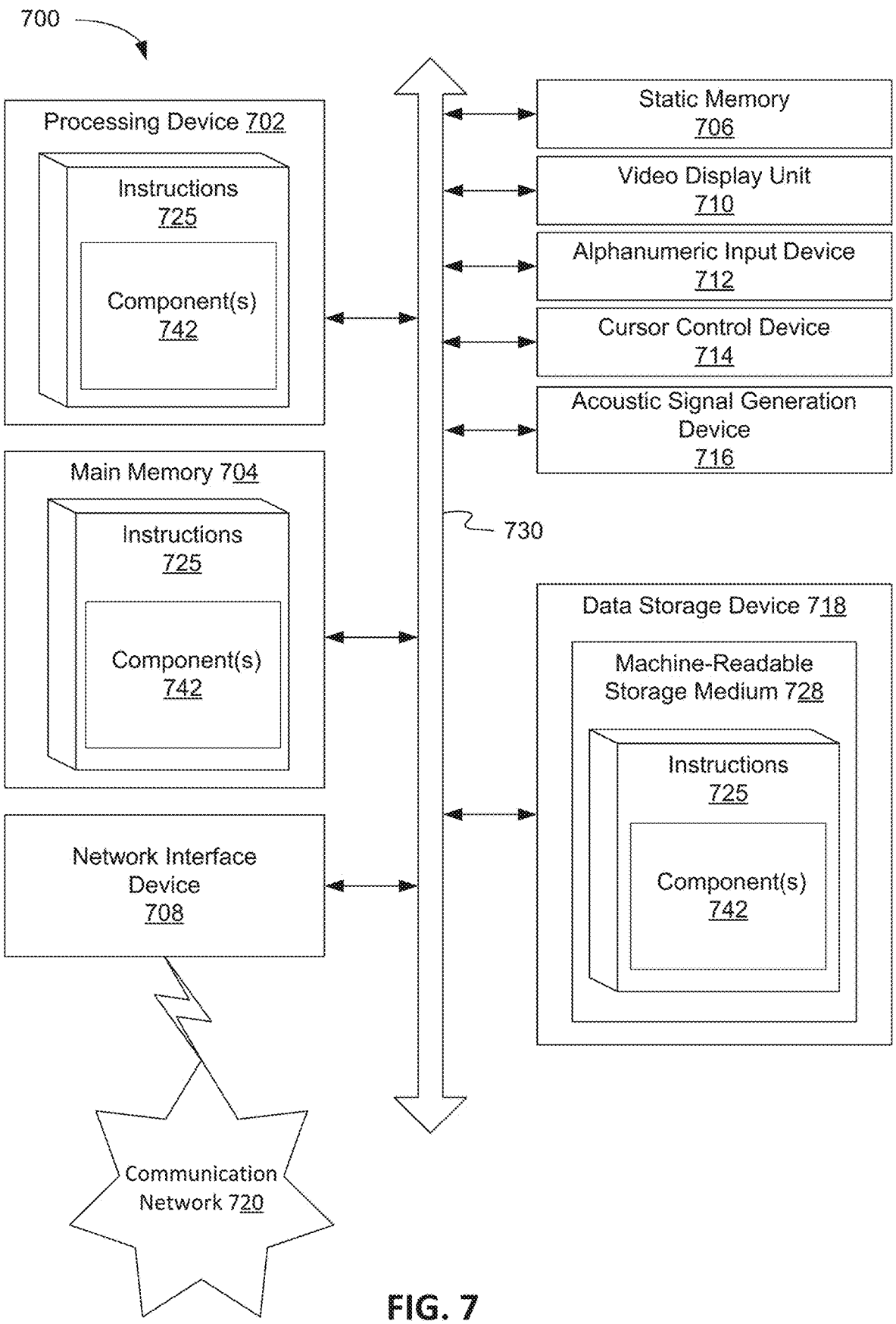
FIG. 7 is a block diagram of an example computing device that may perform one or more of the operations described herein, in accordance with some embodiments.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a communication network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for one or more components 142 (e.g., blockchain management component 210*a* in FIG. 2A, ethical provenance management component 210*b* in FIG. 2B, and/or consumer ethics component 210*c* in FIG. 2C) for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising obtaining, by a processing device, a product identifier and a first set of parameters associated with the product identifier, each parameter indicative of a supply chain of a product corresponding to the product identifier; determining, by a processing device in view of the set of parameters, a first set of qualitative issues associated with the supply chain of the product; and updating, by the processing device, a ledger of a blockchain system to indicate an association between the product identifier and the first set of qualitative issues associated with the supply chain of the product.

Example 2 is the method of Example 1, further comprising sending, to a computing device, a request for one or more parameters associated with the supply chain of the product; and receiving, responsive to sending the request, the first set of parameters.

Example 3 is the method of any of Examples 1-2, further comprising obtaining a second set of parameters associated with the product identifier, each parameter indicative of the supply chain of the product corresponding to the product identifier; and determining, in view of the second set of parameters, a change in the supply chain of the product.

Example 4 is the method of any of Examples 1-3, further comprising determining, responsive to determining the change in the supply chain of the product, an additional qualitative issue associated with the supply chain of the product; and updating the ledger of the blockchain system to indicate an association between the product identifier and the additional qualitative issue associated with the supply chain of the product.

Example 5 is the method of any of Examples 1-4, further comprising determining, responsive to determining the change in the supply chain of the product, an improvement, steadiness, or decline in the first set of qualitative issues associated with the supply chain of the product; and updating the ledger of the blockchain system to indicate the improvement, steadiness, or decline in the first set of qualitative issues associated with the supply chain of the product.

Example 6 is the method of any of Examples 1-5, further comprising determining an association between the first product identifier and the management system; and sending, to a management system responsive to determining the association between the first product identifier and the management system, a message indicating a linkage between the first product identifier and the first set of qualitative issues associated with the supply chain of the product.

Example 7 is the method of any of Examples 1-6, wherein sending the message causes the management system to determine a score for each of the first set of qualitative issues associated with the supply chain of the product, each of the scores are indicative of an importance level according to a user preference.

Example 8 is the method of any of Examples 1-7, wherein sending the message further causes the management system to present each of the scores via an application executing on the client device.

Example 9 is the method of any of Examples 1-8, further comprising determining, in view of the ledger of a blockchain system, an association between a second product identifier and a second set of qualitative issues associated with a supply chain of a second product corresponding to the second product identifier; and sending, to a management system, a message indicating a linkage between the second product identifier and the second set of qualitative issues associated with the supply chain of the product.

Example 10 is the method of any of Examples 1-9, wherein the set of qualitative issues are indicative of at least one of a carbon footprint size, child labor practices, a political structure, drug or human trafficking, diversity-friendly practices, working wages, an impact on global warming, sustainable farming and animal husbandry practices, genetic manipulation (GMO) practices, organic practices, or product longevity and planned obsolescence.

Example 11 is a system comprising a memory; and a processing device, operatively coupled to the memory, to fetch, from a remote database via communication network, a product identifier and a first set of parameters associated with the product identifier, each parameter indicative of a supply chain of a product corresponding to the product identifier; determine, in view of the set of parameters, a first set of qualitative issues associated with the supply chain of the product; and update a ledger of a blockchain system to indicate an association between the product identifier and the first set of qualitative issues associated with the supply chain of the product.

Example 12 is the system of Example 11, wherein the processing device is further to determine, in view of the ledger of the blockchain system, an association between a second product identifier and a second set of qualitative issues associated with a supply chain to a second product corresponding to the second product identifier; and send, to a management system, a message indicating a linkage between the second product identifier and the second set of qualitative issues associated with the supply chain of the product.

Example 13 is the system of any of Examples 11-12, where the processing device is further to obtain a second set of parameters associated with the product identifier, each parameter indicative of the supply chain of the product corresponding to the product identifier; and determine, in view of the second set of parameters, a change in the supply chain of the product.

Example 14 is the system of any of Examples 11-13, wherein the processing device is further to determine, responsive to determining the change in the supply chain of the product, an additional qualitative issue associated with the supply chain of the product; and update the ledger of the blockchain system to indicate an association between the product identifier and the additional qualitative issue associated with the supply chain of the product.

Example 15 is the system of any of Examples 11-14, wherein the processing device is further to determine, responsive to determining the change in the supply chain of the product, an improvement, steadiness, or decline in the first set of qualitative issues associated with the supply chain of the product; and update the ledger of the blockchain system to indicate the improvement, steadiness, or decline in the first set of qualitative issues associated with the supply chain of the product.

Example 16 is the system of any of Examples 11-15, wherein the processing device is further to determine an association between the first product identifier and the management system; and send, to a management system responsive to determining the association between the first product identifier and the management system, a message indicating a linkage between the first product identifier and the first set of qualitative issues associated with the supply chain of the product.

Example 17 is a non-transitory computer-readable medium storing instructions that, when executed by a processing device, cause the processing device to receive, from a blockchain system, a first message indicating a linkage between a first product identifier and a first set of qualitative issues associated with a supply chain of a product corresponding to the product identifier; receive, by the processing device of the management system from a client device, a request for one or more qualitative issues associated with the product identifier; determine, by the processing device, a score for each qualitative issue of the first set of qualitative issues associated with the supply chain of the product corresponding to the product identifier; and send, by the processing device to the client device, a second message to cause the score for each qualitative issue of at least one qualitative issue of the first set of qualitative issues to be presented in an application executing on the client device.

Example 18 is the non-transitory computer-readable storage medium of Example 17, wherein each of the scores are indicative of an importance level according to user preference data and wherein the instructions, when executed by the processing device, further cause the processing device to obtain the user preference data from an account associated with the client device.

Example 19 is the non-transitory computer-readable storage medium of any of Examples 17-18, wherein the instructions, when executed by the processing device, further cause the processing device to select the at least one qualitative issue of the first set of qualitative issues according to the user preference data.

Example 20 is the non-transitory computer-readable storage medium of any of Examples 17-19, wherein the instructions, when executed by the processing device, further cause the processing device to select the at least one qualitative issue of the first set of qualitative issues according to the user preference data.

Example 21 is a method comprising receiving, by a processing device of a management system from a blockchain system, a first message indicating a linkage between a first product identifier and a first set of qualitative issues associated with a supply chain of a product corresponding to the product identifier; receiving, by the processing device of the management system from a client device, a request for one or more qualitative issues associated with the product identifier; determining, by the processing device, a score for each qualitative issue of the first set of qualitative issues associated with the supply chain of the product corresponding to the product identifier; and sending, by the processing device to the client device, a second message to cause the score for each qualitative issue of at least one qualitative issue of the first set of qualitative issues to be presented in an application executing on the client device.

Example 22 is the method of Example 21, wherein each of the scores are indicative of an importance level according to user preference data and further comprising obtaining the user preference data from an account associated with the client device.

Example 23 is the method of any of Examples 21-22, further comprising selecting at least one qualitative issue of the first set of qualitative issues according to the user preference data.

Example 24 is the method of any of Examples 21-23, further comprising receiving, by the processing device from the client device, a second request for information about an additional qualitative issue associated with the supply chain of the product that is absent from the first set of qualitative issues.

Example 25 is the method of any of Examples 21-24, further sending, by the processing device to the blockchain system, a second message indicating the second request for the information about the additional qualitative issue, the second message causing the blockchain system to update the ledger of the blockchain system to indicate an association between the product identifier and the additional qualitative issue associated with the supply chain of the product.

Example 26 is the method of any of Examples 21-25, further wherein the processing device receives the request from the client device responsive to the client device scanning a quick response (QR) code associated with the product identifier or a barcode associated with the product identifier.

Example 27 is the method of Examples 21-26, wherein the set of qualitative issues are indicative of at least one of a carbon footprint size, child labor practices, a political structure, drug or human trafficking, diversity-friendly practices, working wages, an impact on global warming, sustainable farming and animal husbandry practices, genetic manipulation (GMO) practices, organic practices, or product longevity and planned obsolescence.

Example 28 is an apparatus comprising: means for obtaining a product identifier and a first set of parameters associated with the product identifier, each parameter indicative of a supply chain of a product corresponding to the product identifier; means for determining, in view of the set of parameters, a first set of qualitative issues associated with the supply chain of the product; and means for updating a ledger of a blockchain system to indicate an association between the product identifier and the first set of qualitative issues associated with the supply chain of the product.

Example 29 is the apparatus of Example 28, further comprising means for sending, to a computing device, a request for one or more parameters associated with the supply chain of the product; and receiving, responsive to sending the request, the first set of parameters.

Example 30 is the apparatus of any of Examples 28-29, further comprising means for obtaining a second set of parameters associated with the product identifier, each parameter indicative of the supply chain of the product corresponding to the product identifier; and determining, in view of the second set of parameters, a change in the supply chain of the product.

Example 31 is the apparatus of any of Examples 28-30, further comprising means for determining, responsive to determining the change in the supply chain of the product, an additional qualitative issue associated with the supply chain of the product; and means for updating the ledger of the blockchain system to indicate an association between the product identifier and the additional qualitative issue associated with the supply chain of the product.

Example 32 is the apparatus of any of Examples 28-31, further comprising means for determining, responsive to determining the change in the supply chain of the product, an improvement, steadiness, or decline in the first set of qualitative issues associated with the supply chain of the product; and means for updating the ledger of the blockchain system to indicate the improvement, steadiness, or decline in the first set of qualitative issues associated with the supply chain of the product.

Example 33 is the apparatus of any of Examples 28-32, further comprising means for determining an association between the first product identifier and the management system; and means for sending, to a management system responsive to determining the association between the first product identifier and the management system, a message indicating a linkage between the first product identifier and the first set of qualitative issues associated with the supply chain of the product.

Example 34 is the apparatus of any of Examples 27-33, wherein sending the message causes the management system to determine a score for each of the first set of qualitative issues associated with the supply chain of the product, each of the scores are indicative of an importance level according to a user preference.

Example 35 is the apparatus of any of Examples 27-34, wherein sending the message further causes the management system to present each of the scores via an application executing on the client device.

Example 36 is the apparatus of any of Examples 27-35, further comprising means for determining, in view of the ledger of a blockchain system, an association between a second product identifier and a second set of qualitative issues associated with a supply chain of a second product corresponding to the second product identifier; and means for sending, to a management system, a message indicating a linkage between the second product identifier and the second set of qualitative issues associated with the supply chain of the product.

Example 37 is the apparatus of any of Examples 27-36, wherein the set of qualitative issues are indicative of at least one of a carbon footprint size, child labor practices, a political structure, drug or human trafficking, diversity-friendly practices, working wages, an impact on global warming, sustainable farming and animal husbandry practices, genetic manipulation (GMO) practices, organic practices, or product longevity and planned obsolescence Unless specifically stated otherwise, terms such as "obtaining," "determining," "updating," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
obtaining, by a processing device of a blockchain system, a product identifier and a first set of parameters associated with the product identifier from a supply chain data provider, each parameter indicative of a supply chain state of a product corresponding to the product identifier;
determining, by the processing device of the blockchain system and in view of the set of parameters, a first set of ethical issues associated with the supply chain state of the product by comparing each parameter of the set of parameters to a corresponding threshold;
updating, by the processing device of the blockchain system, a ledger of the blockchain system to indicate an association between the product identifier and the first set of ethical issues associated with the supply chain state of the product;
determining an association between a product identifier and a management system managed by a retailer based on the retailer selling a product identified by the product identifier;
sending, to the management system responsive to determining the association between the product identifier and the management system, a message indicating a linkage between the product identifier and the first set of ethical issues associated with the supply chain state of the product, wherein the management system stores the first set of ethical issues to a storage of the management system for retrieval by consumers;

selecting, via a graphical user interface (GUI) of a client device, user preference data comprising an enablement status and an importance level of each ethical issue of the first set of ethical issues, and sending the user preference data to the management system;

receiving a request at the management system from the client device via a local wireless network operated within the retail environment by the management system, wherein the request comprises the product identifier; and responsive to the request, filtering the set of ethical issues associated with the supply chain state of the product based on the enablement status of each ethical issue to generate a filtered subset of enabled ethical issues, and generating scores for each of the filtered subset of enabled ethical issues according to a rule selected from a set of rules of varying strictness based on the importance level of each ethical issue; and sending the filtered subset of ethical issues and the scores to the client device.

2. The method of claim 1, further comprising:

sending, to a computing device, a request for one or more parameters associated with the supply chain state of the product; and receiving, responsive to sending the request, the first set of parameters.

3. The method of claim 1, further comprising:

obtaining a second set of parameters associated with the product identifier, each parameter indicative of the supply chain state of the product corresponding to the product identifier; and determining, in view of the second set of parameters, a change in the supply chain state of the product.

4. The method of claim 3, further comprising:

determining, responsive to determining the change in the supply chain state of the product, an additional ethical issue associated with the supply chain state of the product; and updating the ledger of the blockchain system to indicate an association between the product identifier and the additional ethical issue associated with the supply chain state of the product.

5. The method of claim 3, further comprising:

determining, responsive to determining the change in the supply chain state of the product, an improvement, steadiness, or decline in the first set of ethical issues associated with the supply chain state of the product; and updating the ledger of the blockchain system to indicate the improvement, steadiness, or decline in the first set of ethical issues associated with the supply chain state of the product.

6. The method of claim 1, wherein the management system is to present each of the scores via an application executing on the client device.

7. The method of claim 1, further comprising:

determining, in view of the ledger of the blockchain system, an association between a second product identifier and a second set of ethical issues associated with a supply chain state of a second product corresponding to the second product identifier; and sending, to a management system, a message indicating a linkage between the second product identifier and the second set of ethical issues associated with the supply chain state of the product.

8. The method of claim 1, wherein the set of ethical issues are indicative of at least one of a carbon footprint size, child labor practices, a political structure, drug or human trafficking, diversity-friendly practices, working wages, an impact on global warming, sustainable farming and animal husbandry practices, lack of animal-derived materials, genetic manipulation (GMO) practices, organic practices, or product longevity and planned obsolescence.

9. A system comprising:

a memory; and a first processing device, operatively coupled to the memory, to:

fetch, from a remote database of supply chain data provider via a communication network, a product identifier and a first set of parameters associated with the product identifier, each parameter indicative of a supply chain state of a product corresponding to the product identifier;

determine, in view of the set of parameters, a first set of ethical issues associated with the supply chain state of the product by comparing each parameter of the set of parameters to a corresponding threshold;

update a ledger of a blockchain system to indicate an association between the product identifier and the first set of ethical issues associated with the supply chain state of the product;

determine an association between a product identifier and a management system managed by a retailer based on the retailer selling a product identified by the product identifier; and send, to the management system responsive to determining the association between the product identifier and the management system, a message indicating a linkage between the product identifier and the first set of ethical issues associated with the supply chain state of the product, wherein the management system stores the first set of ethical issues to a storage of the management system for retrieval by consumers;

a second processing device of a client device to:

select, via a graphical user interface (GUI) of the client device, user preference data comprising an enablement status and an importance level of each ethical issue of the first set of ethical issues, and send the user preference data to the management system; and a third processing device of the management system to:

receive a request at the management system from the client device via a local wireless network operated within the retail environment by the management system, wherein the request comprises the product identifier;

responsive to the request, filter the set of ethical issues associated with the supply chain state of the product based on the enablement status of each ethical issue to generate a filtered subset of enabled ethical issues, and generate scores for each of the filtered subset of enabled ethical issues according to a rule selected from a set of rules of varying strictness based on the importance level of each ethical issue; and send the filtered subset of enabled ethical issues and the scores to the client device.

10. The system of claim 9, wherein the first processing device is further to:

determine, in view of the ledger of the blockchain system, an association between a second product identifier and a second set of ethical issues associated with a supply chain state of a second product corresponding to the second product identifier; and send, to a management system, a message indicating a linkage between the second product identifier and the second set of ethical issues associated with the supply chain state of the product.

11. The system of claim 9, where the first processing device is further to:

obtain a second set of parameters associated with the product identifier, each parameter indicative of the supply chain state of the product corresponding to the product identifier; and determine, in view of the second set of parameters, a change in the supply chain state of the product.

12. The system of claim 11, wherein the first processing device is further to:

determine, responsive to determining the change in the supply chain state of the product, an additional ethical issue associated with the supply chain state of the product; and update the ledger of the blockchain system to indicate an association between the product identifier and the additional ethical issue associated with the supply chain state of the product.

13. The system of claim 11, wherein the first processing device is further to:

determine, responsive to determining the change in the supply chain state of the product, an improvement, steadiness, or decline in the first set of ethical issues associated with the supply chain state of the product; and update the ledger of the blockchain system to indicate the improvement, steadiness, decline in the first set of ethical issues associated with the supply chain state of the product.

* * * * *